United States Patent

[11] 3,552,247

| [72] | Inventor | John E. P. Pickett<br>3323 Pinafore Drive, Durham, N.C. 27705 |
|---|---|---|
| [21] | Appl. No. | 844,362 |
| [22] | Filed | July 24, 1969 |
| [45] | Patented | Jan. 5, 1971 |

[54] APPARATUS AND METHOD FOR DIRECT MOUNTING OF MICROTOME TISSUE SPECIMENS
12 Claims, 12 Drawing Figs.

[52] U.S. Cl. .................................................. 83/24,
83/78, 83/98, 83/155, 83/915.5
[51] Int. Cl. .................................................. B26d 4/46
[50] Field of Search .......................................... 83/23, 24,
98, 155, 915.5, 167, 78, 13, 701; 153/23, 123

[56] References Cited
UNITED STATES PATENTS

| 3,091,144 | 5/1963 | Villalobos | 83/915.5X |
| 3,103,844 | 9/1963 | Persson | 83/167 |

*Primary Examiner*—James M. Meister
*Attorney*—B. B. Olive

ABSTRACT: Microtome cut tissue sections are mounted directly onto a film base by a method and apparatus which eliminates the usual interim manual lifting of the cut sections from the blade and the usual water bath and manual floating steps. A microtome trough filled with a liquid receives the cut tissue sections directly from the microtome knife. The sections are floated across the trough and into contact with a film which is passed through the trough. The film with the sections adhered thereto are then fed into a reel.

PATENTED JAN 5 1971

INVENTOR.
John E. P. Pickett

BY

B. B. Olive
ATTORNEY

INVENTOR.
John E. P. Pickett

BY

B. B. Olive

ATTORNEY

PATENTED JAN 5 1971

INVENTOR.
John E. P. Pickett

BY

B. B. Olive
ATTORNEY 3,552,247

APPARATUS AND METHOD FOR DIRECT MOUNTING OF MICROTOME TISSUE SPECIMENS

BACKGROUND OF THE INVENTION

1. Field of the Invention

The invention relates broadly to histologic tissue preparation and more specifically to microtome tissue cutting and film mounting methods and apparatus.

2. Description of the Prior Art

Reference may be made to two publications of interest, namely AMA Archives of Pathology, Pickett J. P. et al. "Thirty-Five MM Film as Mounting Base and Plastic Spray as Cover Glass for Histologic sections," Vol. 69 Mar. 1960, Pages 239—247 ; and "Improved Film Strip Technique for the Laboratory," same publication Vol. 77 Apr. 1964, Pages 429—433, same authors. Also see "Stain Technology" Vol. 43, No. 3, May, 1968; U.S. Pat. No. 3,091,144, No. 3,103,844, No. 3,225,639 and No. 3,377,898. The referred to prior art deals with both light and electron microscopy techniques. While the prior art teaches the concept of mounting tissue on film and also the techniques having an intermediate water bath on which the tissue is floated after leaving the microtome blade, the prior art does not teach direct mounting of the tissue from the blade to the film.

SUMMARY OF THE INVENTION

The present invention provides a microtome trough for use in combination with a standard microtome and which receives tissue sections directly from the microtome knife and which also provides means for mounting the tissue sections on a film base immediately adjacent the microtome knife. The fragile sections once cut may be mounted without having to be lifted off the blade face. The microtome trough, which is movably attached to the microtome knife, allows paraffin tissue sections in ribbons to be floated across a warm liquid contained within the trough upon coming directly from the knife edge and then to continue onto a base film which is automatically fed into the trough below the water level and as it emerges therefrom the sections are guided onto the film in ribbon form or in individual sections and the film is then automatically fed into a reel. The type of film strip may vary. Ordinary motion picture leader film such as DuPont, "Cronar" P40B film is suitable. At no time in the normal operation is it necessary for the operator to physically touch the fragile section ribbons since he merely guides the leading, starting end of the ribbon with a small brush, e.g. a small artist brush, directly onto the moistened film base and otherwise guides the section ribbon only when it breaks apart. By carefully controlling film speed such breakage can be avoided. The sections are thus cut and mounted on a film base and transferred to a processing reel all immediately adjacent the microtome.

It is therefore the object of this invention to provide an apparatus which will receive specimen sections directly from the cutting device and which mounts the specimen sections directly on a film substrate immediately adjacent the cutting edge and while avoiding the usual lifting of the fragile sections. This and other objects will appear from the description to follow.

DETAILED DESCRIPTION

Figure 1:
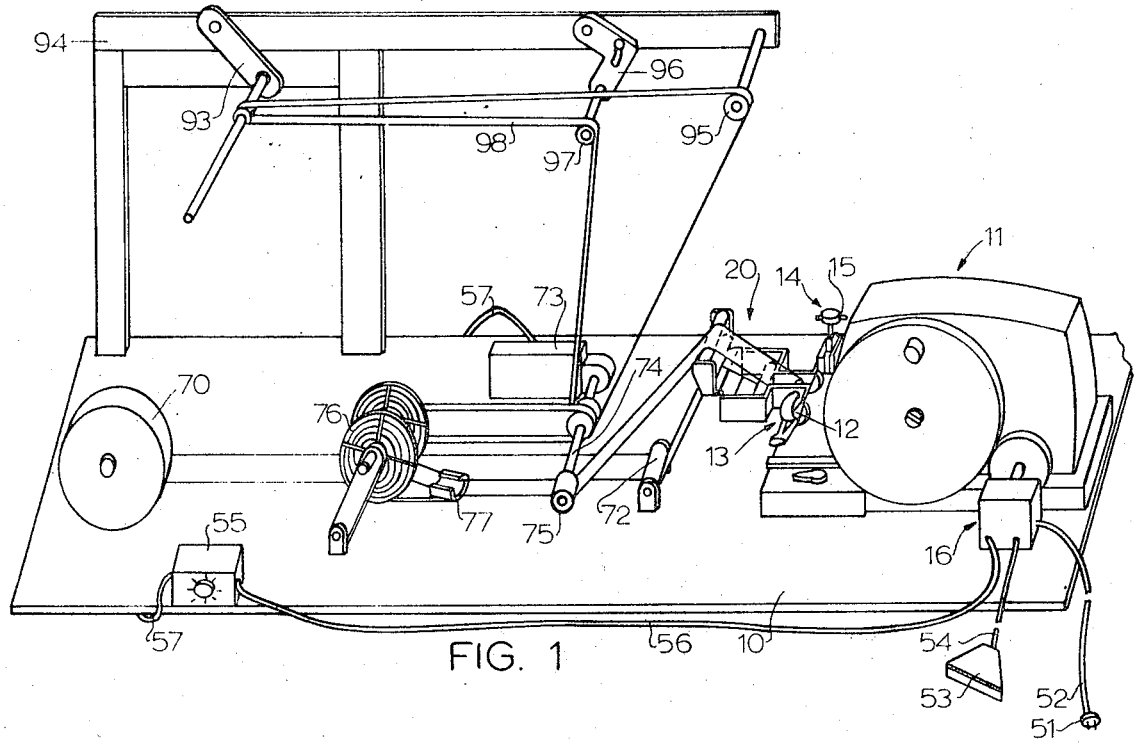
FIG. 1 is a pictorial view of the complete apparatus of the invention showing transfer of specimen section ribbons directly from the cutting device to a film substrate and then loading of the film substrate onto a short film length reel for processing.

Referring to FIG. 1, there is illustrated the complete apparatus embodying the invention all being mounted on a common base member 10. A standard microtome 11 is mounted adjacent one end of base 10. Knife 12, which is preferably made from stainless steel due to its contact with the liquid, is removably secured on microtome 11 by the standard knife holder 13. Standard microtome head 14 receives the embedded specimen and by turning hand screw 15, the specimen is firmly held in head 14 for cutting by knife 12. Microtome drive unit 16 is mounted on base 10 and drives microtome 11 according to standard procedure.

Referring now particularly to FIGS. 2—8 for a detailed description of the microtome trough, there is illustrated a receptacle or trough 20 which is adapted to be removably mounted on microtome knife 12 and which provides a receptacle for any suitable inert liquid, water being preferable, adapted to float tissue specimen section ribbons thereon immediately upon being cut on microtome 11 by knife 12. Stated differently, the liquid chosen provides an essentially frictionless surface over which the sections can be transferred in moving from the blade to the film. Trough 20 in conjunction with the liquid acts to guide and transfer the ribbon to the film. Trough 20 is constructed of a pair of integral chambers 21, 22. Chamber 21 is of a width capable of receiving substantially wide 70mm film and chamber 22 15 of a width capable of receiving substantially narrow 35mm film. Chamber 21 is substantially rectangular in shape and is comprised of sidewalls 23, 24, 25, 26 and 27 and a base member 28. Chamber 22 has walls 29, 30 and end enclosure wall 31. The end of walls 29, 30 are tapered as at 29a , 30a (FIGS. 2 and 3) and have integral extensions 32, 33 which are slanted with the identical taper as at 29a, 30a. End closure wall 31 is of slightly less height than the other wall members and also is slanted with a taper as at 29a, 30a. Seal 31a assures a leak proof seal against knife blade 12. These previously mentioned tapers are provided so as to mate with the knife blade which is placed in the conventional knife holder at a particular angle.

A film guide roller 40 is rotatably mounted in sidewalls 24, 26 of chamber 21 and acts as a guide for the relatively wide 70mm film as it passes into and out of chamber 21. A guide roller 41 is rotatably mounted in chamber 22 in sidewalls 29, 30 and is adapted to receive relatively narrow width 35mm film as it enters into chamber 22 and out of the trough.

Wall 25 of chamber 21 has an extension 42 thereto and is bent back at a right angle to vertical wall 25 and is of a predetermined width. A film guide bracket generally indicated at 45 has a flat base member 46 which is made integral to extension 42 of vertical wall 25. Base member 46 has a pair of integral upright side members 47, 48. Upright members 47, 48 receive a pair of film guide rollers 49, 50 which act to guide the film whether it be 35mm or 70mm into trough 20 and guide the film from trough 20 to the storage reel. While not shown it should be understood that the film edges are perforated for drive purposes as later described.

Figure 9:
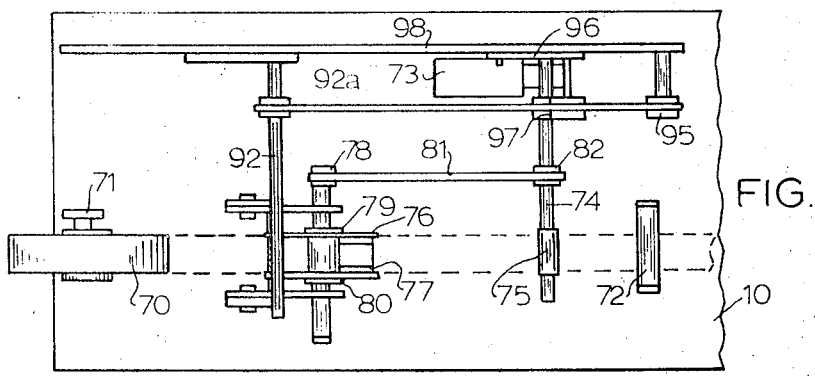
FIG. 9 is a plan view of the film supply and film takeup apparatus employed in the present invention.
Figure 10:
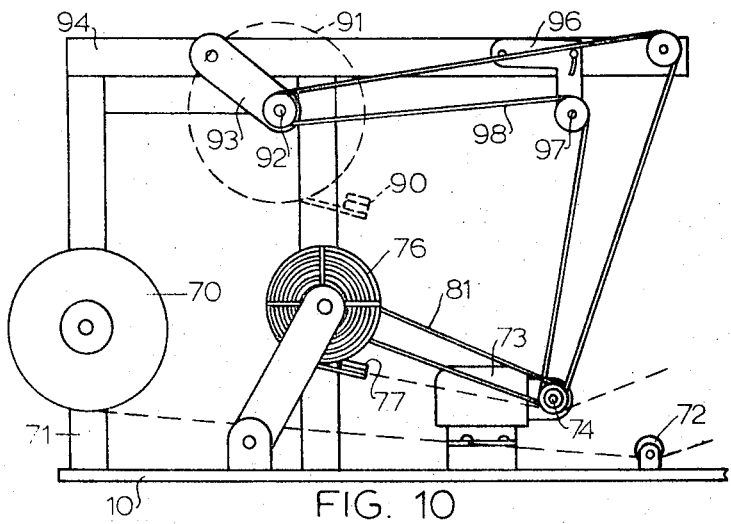
FIG. 10 is a side elevation view of the apparatus of FIG. 9.
Figure 2:
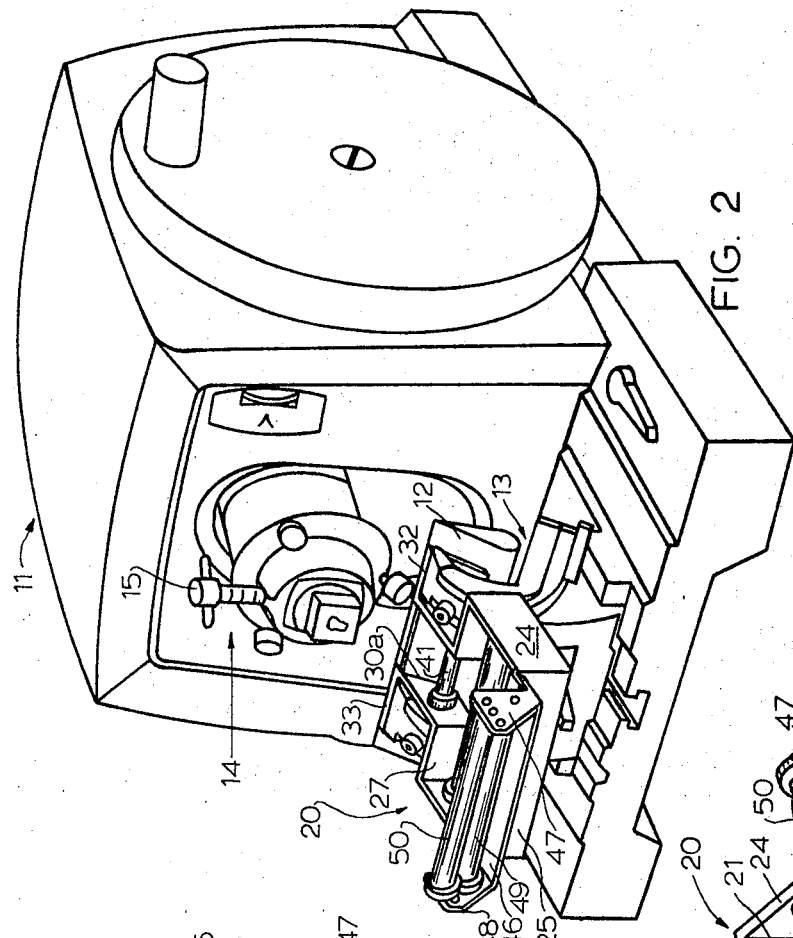
FIG. 2 is a perspective view of a conventional microtome with the trough apparatus of the invention mounted on the microtome knife.

Having described microtome trough 20, the description will no— now be directed to the film supply and take up apparatus which is also mounted on base 10 and which is best seen in FIGS. 1, 9 and 10. Although an integral part of the complete system, the film supply and take up apparatus could be treated as a separate unit. Microtome 11, microtome trough 20 and the film apparatus are mounted on the common base 10 in order to simplify arrangement of the film delivery and return for trough 20. A film supply roll 70 is mounted rotatably on a support 71 and feeds out in a plane parallel to base 10. The film, which may be either 35mm or 70mm, advances to guide roller 72 which is mounted on base 10 so that the film is fed beneath the roller 72 and from there it rises to pass over roller 49 of trough 20.

A drive motor 73 for the film reel and takeup is mounted on base 10. Motor 73 has a drive shaft 74 extending therefrom which is of sufficient length to allow for the mounting of the several pulleys shown thereon. Pulley 75 is mounted adjacent the free end of shaft 74, is adjustable in width and will receive either the wide or narrow film. Pulley 75 also has teeth on the end thereof which mate with the previously mentioned but not shown perforated film edge and which will pull the film along. The length of pulley 75 will of course depend upon the width film in use. The film then passes onto a reel 76 rotatably supported from base 10. Reel 76 as shown positioned in FIG. 1 is designed to receive a relatively short length film whereas the invention also adapts to relatively long length film as later described. A film crimper 77 first receives the film and then feeds it onto reel 76. Reel 76 has a pulley 78 mounted on the end of a spring loaded reel holder 79. A comparable holder 80 is located on the opposite side of reel 76 and the spring forces of the two holders in effect holds the reel 76 in place and also allows for rotation of reel 76. Pulley 78 has a belt drive 81 which runs back to shaft 74 and is received by pulley 82 which is mounted on shaft 74. This drive arrangement provides the means whereby the film is advanced through the trough 20 and is returned to be mounted on takeup reel 76.

In addition to receiving the relatively narrow, short length, 35mm film, relatively wide, short length 70 mm film may be supplied to trough 20 by simply replacing reel 76 with a reel adapted to accommodate short length, relatively wide 70mm film, replacing pulley 75 with a wider pulley and by providing a film supply of relatively wide, 70mm film.

A relatively narrow, long length, 35mm film may be obtained by guiding film 70, after exiting trough 20, beneath pulley 75 and up and through crimper 90 and into large takeup reel 91 rotatably mounted on shaft 92. Also, a relatively wide, long length, 70mm film may be obtained by feeding the relatively wide, long length, 70mm film parallel to base 10 as for 35mm film and allowing it to pass under guide roller 72 and up over roller 49, down into trough 20 and under roller 40, which is specifically for 70mm film, then up over roller 50, and then down beneath pulley 75 and upward. The film then passes through a suitable crimper and onto a wide film reel which is rotatably mounted on shaft 92 which is movably mounted by arm 93 pivotally secured to frame 94. Pulley 92a is also mounted on shaft 92. A fixed rotatable pulley 95 is mounted at a predetermined point on frame 94. A pivoting bracket 96 mounts another pulley 97. When using large reel 91, the belt 98 is placed on pulley 92a and runs over pulley 95 down to a pulley 98 mounted on shaft 74 and then up over pulley 97, which is adjustable for tension purposes, and back over pulley 92a to complete the drive for reel 91.

As previously described, reels for accommodating long lengths of 35mm or 70mm size films can be mounted on shaft 92 and that reels for accommodating short lengths of 35mm or 70mm size films can be mounted on spring reel holders 79, 80.

Microtome drive motor 16 is powered through a standard outlet plug 51 through line 52. A foot pedal control 53 can be used to control the speed of microtome 11 through line 54. A hand control 55, which has various speed settings, is used to control the film which is being fed into trough 20. Power for control 55 is received through line 56 from drive motor 16.

Hand control 55 in effect controls motor 73 through line 57 and motor 73 effects the take up of the film from trough 20 onto reels 76 or 91. Motor 73 in effect causes the feeding of the film into trough 20 and also the pulling of the film from the trough 20 and by means of belt 81 causes the film to be reeled into reel 76 or 91.

It has been found that by cooling knife 12 and maintaining it at a temperature of 34°—35° C and by heating the liquid in trough 20 and maintaining it at a temperature of approximately 52° C, the tissue sections are cut smoothly and slide freely from knife 12 and flatten out on the heated liquid. Various means may be used for heating and cooling. As an example there is shown a small thermoelectric unit 99, having a cooling area and a warming area respectively arranged to maintain the knife cool and the liquid heated within the desired temperature ranges. A second thermoelectric unit for cooling may be secured to the face of the microtome head against which the embedded tissue block is placed for sectioning. A cool specimen block, as well as a cool knife, is preferred and provides the best sections. When the knife and the block are cooled, the section ends tends to overlay and adhere together to form the ribbon. Other simple cooling means such as wiping the face of the tissue block with ice may be used. The paraffin, in which the tissue specimen is embedded, helps support the specimen sections on the film until the sections support themselves by means of the proteins within the tissue. Once the paraffin is heated off, the proteins in the sections tends to hold the sections on the film. The water serves primarily as a means for providing a frictionless surface for transfer of the sections from the blade and assist in smoothing the sections on the film.

Figure 3:
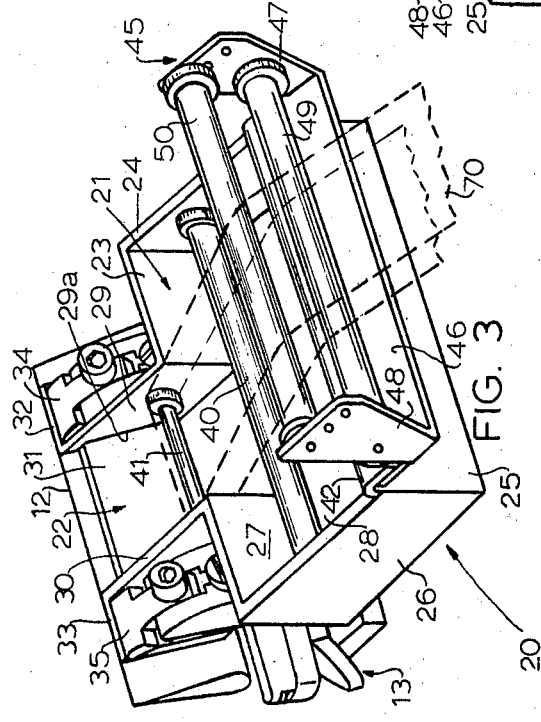
FIG. 3 is an enlarged perspective view of the microtome knife of FIG. 2 with the trough of the invention and showing the same being used for mounting sections on narrow width, 35mm film.
Figure 4:
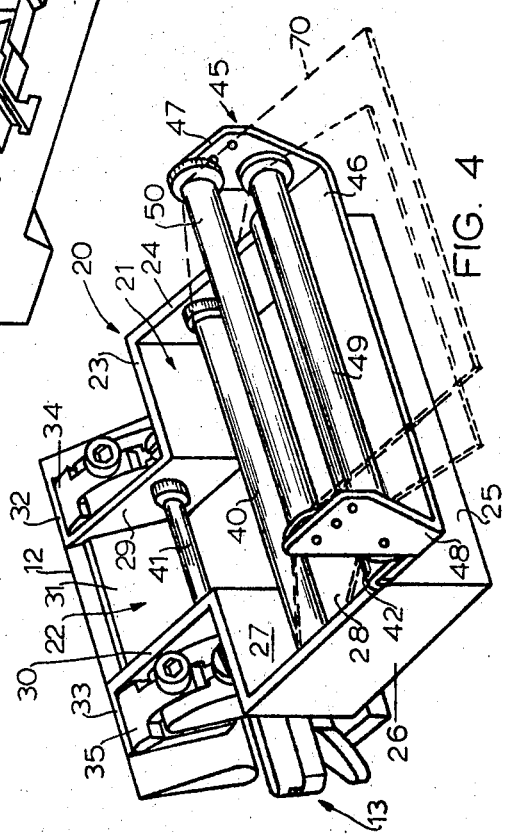
FIG. 4 is a view similar to FIG. 3 illustrating the use of wide width, 70mm film.

The invention will now be described in operation. Microtome receptacle or trough 20 is rigidly attached to microtome knife 12 by means of knife fastening means 13 and finger clamps 34, 35. Once finger clamps 34, 35 are tightened against extensions 32, 33 of trough 20, trough 20 is held in a plane parallel to base 10. A film supply reel, which in the case of FIGS. 1 and 3 is of 35mm size, contains the film 70 which passes underneath roller 72, up and over roller 49 and downward beneath the roller mounted between walls 29, 30 of chamber 22. The film is then fed up over this roller and back upward until it passes over roller 50 and then is fed downward beneath roller 75 which has teeth thereon for pulling the film from the trough and is fed then into crimper 77 and onto storage and processing reel 76. FIG. 4 illustrates how 70mm film is similarly threaded in trough 20. A liquid, e.g. water is placed in trough 20 and is heated as described. The level of the liquid rises to the edge of the knife blade 12 which is cooled as stated and this level is maintained at all times. Since the liquid is immediately adjacent the tip of cooled knife 12, the tissue sections tend to float and stretch out as they come onto the heated liquid and as sections are cut consecutively, the section ends overlay and adhere together and form a ribbon of flat sections. To get the ribbon of flat sections from the heated liquid, film of either 35mm or 70mm and of either short or long lengths is used. The film is easily maneuverable and comes into the back of the trough 20 as previously described above the liquid level. The microtome is energized by means of foot pedal 53 which in turn causes knife 12 to slice sections of tissue on the order of 4—10 microns in thickness. Although thinner sections and thicker sections can be obtained, usually 4—10 microns is an average thickness for sections. The ribbon of tissue is picked up just as the film leaves the heated liquid and merges onto the film. The cutting action of the microtome is responsible for the advancing section ribbon. As each section is cut, the section is deposited on the knife and as the next section is cut and the two adjacent section ends overlap, the last cut section pushes the previous cut section forward. This action continues until the ribbon reaches the point at which the film emerges from the liquid and the ribbon contacts the film. The ribbon leading end is manually brushed onto the film. Thereafter so long as the continuity of the ribbon is maintained, the ribbon continues to feed onto the film without manual handling.

Figure 11:
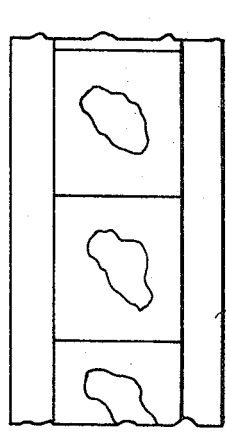
FIG. 11 is a fragmentary plan view of a section of film showing tissue sections mounted on the film in a continuous ribbon.
Figure 5:
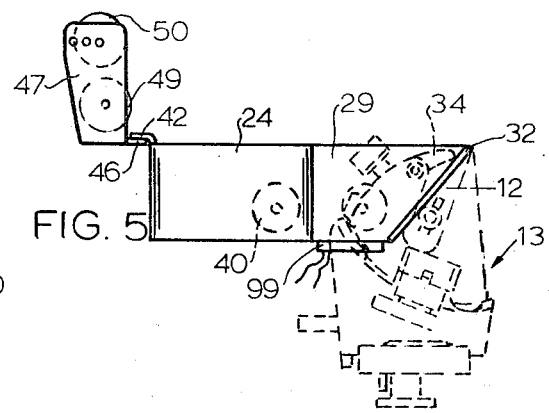
FIG. 5 is a side elevation view of the microtome trough apparatus of the invention mounted on the microtome knife with the microtome knife and mounting means shown in dashed lines.
Figure 6:
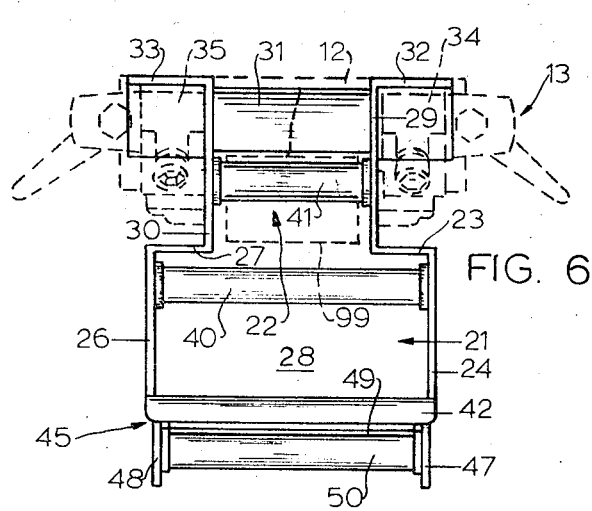
FIG. 6 is a top plan view of the apparatus of FIG. 5.
Figure 12:
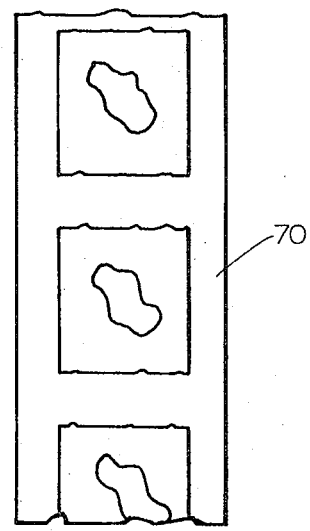
FIG. 12 is a fragmentary plan view of a section of film showing individual tissue sections mounted on the film in a spaced relation to each other.
Figure 8:
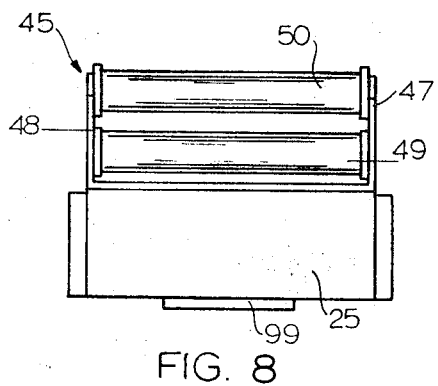
FIG. 8 is a rear elevation view of the apparatus of FIG. 7.
Figure 7:
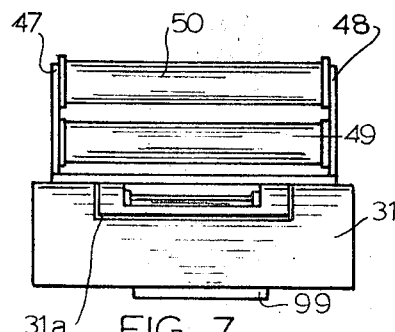
FIG. 7 is a front elevation view of the microtome trough with the microtome knife and mounting means removed.

As shown in FIGS. 11 and 12, sections may be mounted on the film in a continuous ribbon (FIG. 11) or in spaced sections (FIG. 12). As in the case of FIG. 11, the cutting speed of the microtome and the takeup film speed are substantially synchronized so that the ribbon is not pulled apart. As in the FIG. 12 case, the cutting speed is substantially slower than the film takeup speed and the ribbon sections are pulled apart by the faster moving film. The slope at which the film emerges is of sufficient angle to effect substantial draining of excess liquid from the film. Motor 73 is used to advance the film containing ribbons of tissue into reel 76 or 91 and to advance the film into the liquid. The film speed is adjustable by means of hand control 55. The unit will allow use of either 35 or 70mm film as previously mentioned and also various sizes of reels such as 5 foot capacity or 100 foot capacity reels of both film sizes.

As previously stated, it has been found that by cooling knife 12 the operator can get a better cut from the tissue block which is suitably cooled such as by wiping the face of the tissue block with a piece of ice or by use of permanently installed thermoelectric units. In addition to cooling knife 12 and the tissue block, the liquid in trough 20 is heated which causes the tissue sections to flatten out before reaching the film. Although various liquids may be used, it has been found that ordinary tap water or if preferred distilled water may be used and will provide good results. Also, the distance between the point that the tissue reaches the water and the point it emerges from the water is sufficient to allow the tissue to flatten out but not great enough to allow the ribbons to curl as will happen if they are allowed to float on the liquid for too long a distance before it feeds onto the film. The angle of the emergence of the film from the liquid is not deemed critical but it has been found that from 30 to 45° will allow proper drainage of the liquid from the film.

The invention is preferably applied to paraffin or similar thermoplastic embedded specimens. However, in its broadest concept the invention lends itself to any specimen which when cut into thin slices is adapted to have such slices or sections slide onto and to adhere by the inherent character e.g. by protein content, to a film substrate. That is, the specimen once sectioned and smoothed onto the film should preferably have the inherent character of adhering to the film. Pathological tissue with its protein content tends to have this character.

I claim:

1. In a histology and like tissue sectioning and mounting system, in combination:
   a. microtome means providing a vertically reciprocating clamp and a fixed blade for reciprocating a clamped specimen past the blade to slice substantially thin sections on the order of 4—10 microns thickness and to deposit said sections on the front face of said blade in a substantially continuous sequence and in a manner of slicing to cause each section to move down said front face;
   b. receptacle means including a liquid filled receptacle disposed adjacent to and beneath the edge of said blade and adapted to receive and float on the surface of the liquid therein successive said sections, said liquid surface being of sufficient size to allow successive groups of said sections to be wet on one side and to collect on said liquid surface in a substantially flat ribbon form;
   c. a thin flexible smooth surfaced strip film compatible in character with said liquid and sections such that when said sections are wet by said liquid, mounted on said film and then drained, said sections tend to flatten and adhere thereon;
   d. film mounting means including supply and takeup reels, tracking means effective to track said film at a selected speed in said receptacle so as to bring an upper surface portion thereof into a mounting position adjacent to said blade and adjacent to the surface of said liquid thereby allowing said sections to move directly from the face of the blade, to the liquid surface and then into engagement with said film without requiring any intervening lifting thereof; and
   e. drive means for said film whereby to maintain said speed so as to provide substantially continuous and steady withdrawal of said film past said mounting position for merging of said sections with said film upper surface at said mounting position.

2. In a system as claimed in claim 1 wherein said drive means and speed are variable and adapted to maintain substantially continuous and steady withdrawal of said film past said mounting position.

3. In a system as claimed in claim 1 including means to heat said water and cool said blade and specimen.

4. In a system as claimed in claim 1 wherein said liquid constitutes water, said specimen constitutes an embedded histologic specimen and said manner of slicing causes said sections to slightly overlap and form a ribbon thereof and to cause leading sections to be pushed downwardly on said blade.

5. In a system as claimed in claim 1 wherein said film speed is such that said film is tracked past said mounting position at a speed substantially synchronized with the cutting speed of said microtome such that said sections are fed onto said film and maintained in a ribbonlike form.

6. In a system as claimed in claim 1 wherein said film speed is such that said film is tracked past said mounting position at a speed substantially faster than the cutting speed of said microtome such that said sections are mounted onto said film in a spaced relation.

7. In a system as claimed in claim 1 wherein said receptacle comprises a multiple receptacle having one portion with means adapting said film tracking means to receiving a relatively narrow width film and another portion with means adapting said film tracking means to receiving a relatively wide width film.

8. The method of film mounting microtome sliced embedded histology and like tissue sections cut from a specimen comprising the steps:
   1. continuously slicing said specimen to form said sections at least partially joined in the nature of a ribbon on the front face of a fixed microtome blade;
   2. continuously moving a thin, flexible, smooth surfaced mounting film at a predetermined speed and near said blade, and with one surface of said film being positioned to receive the leading end of said ribbon;
   3. as said ribbon is formed, attaching the leading end thereof to said film in a flat merging relation and while maintaining said speed sufficiently low to avoid breaking said ribbon and while the remainder of said ribbon remains substantially flat on said blade gradually withdrawing said ribbon directly from said blade onto said film while using the pull of said film and the continuity of said ribbon to effect said withdrawal to thereby merge the whole of said ribbon with said film.

9. The method of claim 8 including the step of wetting the ribbon at a point between the microtome blade and the point at which the ribbon merges with said film to effect smooth adhering of the ribbon to said film.

10. The method of claim 9 wherein said wetting step comprises drawing said ribbon through a liquid bath located adjacent said blade.

11. The method of mounting thin histology and like specimen sections on a thin mounting film comprising the steps of:
   1. cutting on a microtome substantially continuous thin specimen sections from a selected embedded specimen to form at least partially connected sections and a ribbon therefrom;
   2. floating said ribbon as it is formed on the surface of a liquid contained within a receptacle mounted on the microtome and while maintaining a minor portion of said film aligned with said ribbon and below said liquid surface and the remainder of said film outside said receptacle;
   3. bringing the leading end of said ribbon comprised of sections against that portion of said film where it leaves said liquid;

4. withdrawing said film with said leading section leading end engaged therewith along a predetermined path of travel to a point remote from said receptacle so as to cause the trailing portion of said section to adhere to said film and to be moved to said point;
5. guiding and supporting said film carrying said mounted sections in a manner leaving said sections comprising said ribbon free of contact with any other surface; and
6. reeling said film into a coiled spaced relation.

12. The method of film mounting microtome sliced embedded histology and like tissue sections cut from a specimen comprising the steps:
1. continuously slicing said specimen to deposit sections on the front face of the microtome blade;
2. as each section is formed directing such section without any intermediate lifting thereof directly from the blade onto a liquid surface positioned adjacent to and beneath the edge of the blade;
3. moving the sections successively on said liquid surface to a mounting position;
4. tracking through said liquid and past said mounting position a strip of film; and
5. at the mounting position withdrawing said film from said liquid and simultaneously smoothly merging each successive section with said film.

PO-1050
(5/69)

UNITED STATES PATENT OFFICE
CERTIFICATE OF CORRECTION

Patent No. 3,552,247          Dated January 5, 1971

Inventor(x) John E. P. Pickett

It is certified that error appears in the above-identified patent and that said Letters Patent are hereby corrected as shown below:

Column 2, line 44, "15" should be "is"

Column 3, line 2, "no-" should be deleted

Column 4, line 36, the comma in first appearance should be a period

Signed and sealed this 22nd day of June 1971.

(SEAL)
Attest:

EDWARD M. FLETCHER, JR.          WILLIAM E. SCHUYLER, JR.
Attesting Officer                   Commissioner of Patents